Jan. 27, 1953 R. A. SANDBERG 2,626,827
BUMPER GUARD
Filed March 3, 1949
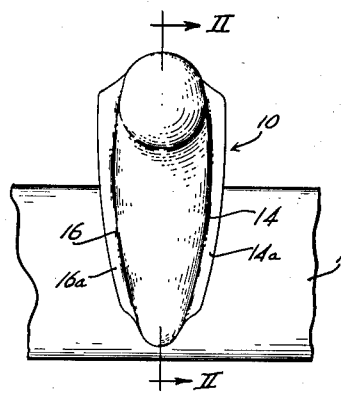
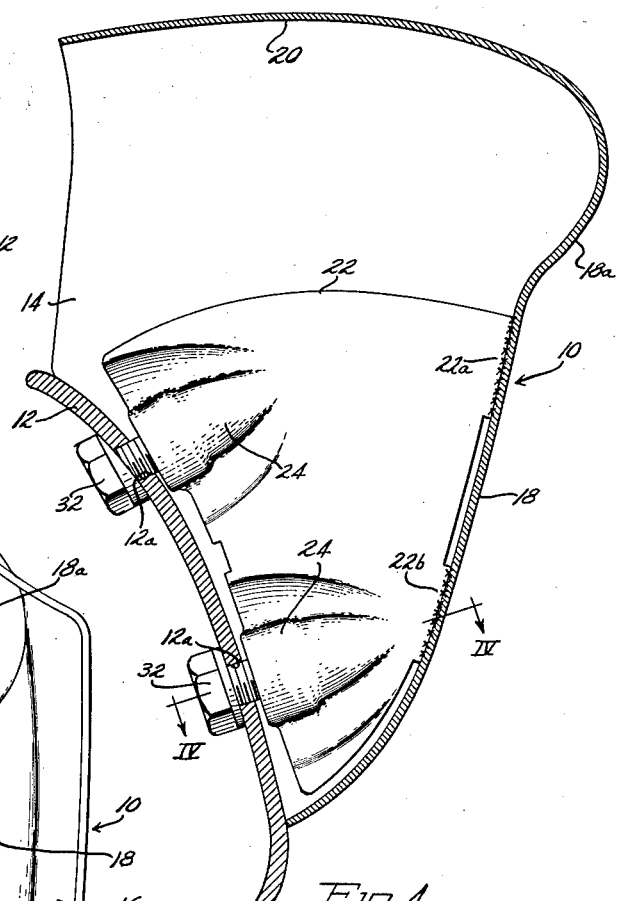
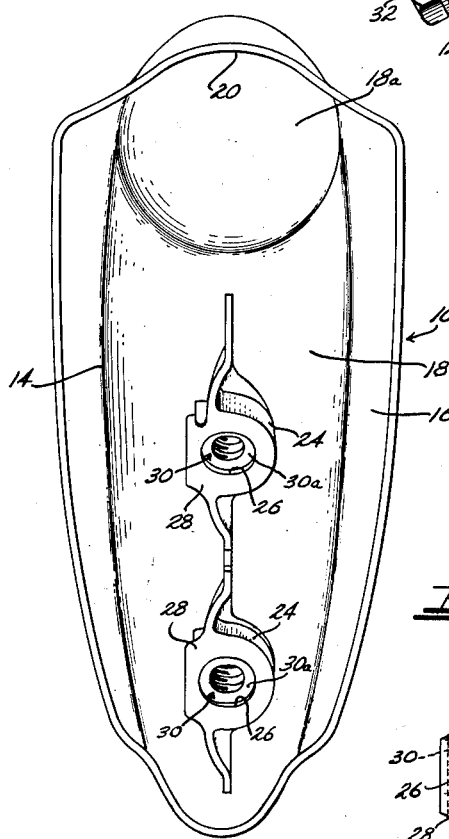
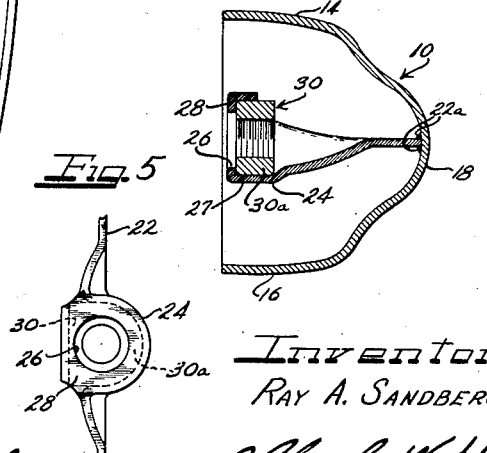
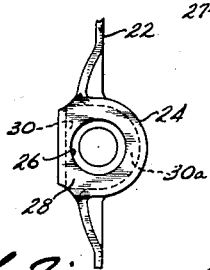
Inventor
Ray A. Sandberg
by The Firm of Charles W. Hills
Attys.

Patented Jan. 27, 1953

2,626,827

UNITED STATES PATENT OFFICE 2,626,827

BUMPER GUARD

Ray A. Sandberg, Waukegan, Ill., assignor to Houdaille-Hershey Corporation, Detroit, Mich., a corporation of Michigan Application March 3, 1949, Serial No. 79,459

2 Claims. (Cl. 293—67)

This invention relates to a novel bumper guard structure for use on automobiles or the like and more particularly concerns a bumper guard of the type adapted to be attached as an accessory on either the rear or forward bumper of an automobile and which may be readily attached at any preselected location along the length of such a bumper.

Automobile design trends are toward long, unbroken, curved lines of symmetry. These design trends have been extended to encompass the externally mounted accessories.

Difficulties have been experienced in the mounting of curvedly designed accessories such as bumper guards to the multi-curved bumpers of the automobile. A particular problem was involved heretofore in that distinctively manufactured right and left hand guards had to be provided for the same bumper, insofar as the configuration of the front and rear bumpers differ and insofar as the configuration of a single bumper differs along its length.

Further difficulties arise in attaining economical manufacturing processess, insofar as the assembly of suitable mounting brackets for bumper guards has been found to be time consuming and costly. Bumper guards per se, are of shell-like construction and heretofore have been manufactured with a cross member supporting the side walls of the shell. This cross bar is objectionable in the bumper guard because it rigidly holds the side walls and thereby reduces the resilience of the side walls thus permitting the shell to be permanently deformed upon a relatively light impact.

The present invention has for its object to dispense with the use of a cross brace by securing a plate within the shell against the inside of the front wall thereof in the vertical median plane of the shell so as to be substantially parallel to the side walls to provide a buttress reinforcement for the shock wall and also a mounting bracket for the bumper guard.

Other and further objects, features and advantages of the present invention will become apparent to those skilled in the art from the following detailed description of a preferred embodiment thereof, taken in conjunction with the accompanying drawings in which:

Figure 1 is a front elevational view of a bumper guard, constructed in accordance with the teachings of the present invention, mounted on a bumper of an automobile;

Figure 2 is a vertical sectional view on an enlarged scale taken substantially as indicated by the lines II—II of Figure 1;

Figure 3 is a rear elevational view of the bumper guard of Figures 1 and 2, removed from the bumper and showing the attaching means;

Figure 4 is a cross-sectional view taken substantially as indicated by the line IV—IV on Figure 2 showing in detail the mounting bracket; and Figure 5 is a fragmentary rear elevational view of the lower attaching means in the bumper guard mounting bracket or buttress reinforcing wall.

In Figure 1 and the other views, the reference numeral 10 indicates, generally, a bumper guard, constructed in accordance with this invention, which is suitable for attaching to either the forward or rear bumper or at either side of such a bumper. As shown in Figures 1 and 2 the bumper guard 10 is secured to a bumper 12 and has a hollow shell construction, being closed on all sides with the exception of the side which is toward the bumper 12 thus permitting side walls 14 and 16 thereof to engage the bumper edgewise.

The bumper guard is elongated in the vertical direction and has the long, sweeping, symmetrically curved surfaces currently popular in the design of automobiles and their accessories. The side walls 14 and 16 are integrally formed as by stamping from the same piece of metal stock and their front portions form a symmetrically curved front or shock wall 18. It will be noted that the top portion of the shock wall 18 is outwardly bulged to provide a reinforcing nose 18a which merges with a curved top wall 20 in keeping with the streamlining.

The bumper guard 10 is secured to the bumper 12 by a vertical, centrally internally disposed attaching bracket plate 22 which may be economically manufactured as a sheet metal stamping. As seen in Figure 2 the plate 22 is of substantially triangular configuration having two comparatively longer edges, one of which is welded at spaced sections 22a and 22b to the inner surface of the shock wall 18 along the vertical median line thereof. By so welding the plate 22 at spaced intervals the welding load is lessened. The other long edge of the plate 22 is disposed to oppose closely the adjacent surface of the bumper in assembly.

The margin of the plate 22 which is adjacent the bumper has hollow bosses 24 formed therein of generally semi-cylindrical configuration with end closure flanges which are apertured to provide bolt passage apertures 26. The semi-cylindrical bosses have an annular grooved seat 27 and the end closure flanges are formed with locking terminals 28 which cooperate with the grooved seats 27 to receive and lock a specially formed nut 30 therein. As seen in Figure 5 the nut has one-half of its body squared and the other half is of generally semi-cylindrical configuration as indicated at 30a to fit within the annular grooved seat 27 while the squared portion of the nut 30 is clamped by the locking flange terminal 28. The internally threaded aperture in the nut 30 is in register with the bolt passage aperture 26.

The bumper guard 10 is positioned against the bumper 12 so that bumper apertures 12a and the bolt receiving apertures 26 are alined and bolts 32 may be threaded into the nut 30 from the back side of the bumper 12.

In addition to affording means for securement to the bumper, the attaching plate 22 also provides a buttress reinforcement for the shock wall 18. Much of the shock ordinarily taken by the bumper guard side walls is taken by the buttress reinforcing plate 22 in a manner which will not detract from the general resiliency of the bumper guard shell and the bumper guard is less apt to be permanently deformed by impact.

It will be understood that various details of construction may be varied through a wide range without departing from the principles of the present invention, and it is, therefore, not the purpose to limit the patent granted hereon otherwise than necessitated by the scope of the appended claims.

I claim as my invention:

1. A guard structure for vertical mounting on a vehicle bumper to increase the effective height of said bumper, said guard structure comprising a shell symmetrical about its vertical median plane and having a closed forward shock receiving portion defined by integral front, top and side walls and a rearwardly facing opening defined by the free edges of said walls, the lower portions of said front and side walls providing a downwardly continuous rear edge contoured to conformingly abut the outer face of said bumper the full length of said edge, a sheet metal plate welded edgewise against the inside of said front wall along the vertical median line thereof and extending rearwardly thereof between and free of said side walls, mounting means carried solely by said plate, and securing means adapted to be carried by said bumper for cooperation with said mounting means to secure said guard structure on said bumper with said continuous rear edge in full edge-abutment against the bumper outer face.

2. A guard structure for vertical mounting on a vehicle bumper to increase the vertical extent of said bumper, said structure comprising a stamped metal shell having integral and continuous front, top and side walls symmetrical about a vertical median plane, the side walls and the lower portion of the front wall providing a downwardly continuous rearwardly facing edge contoured to conformingly abut the outer face of said bumper, a sheet metal plate secured edgewise against the inside of said front wall along the vertical median line thereof and providing rearwardly facing vertically aligned hollow bosses positioned within said shell inwardly of said continuous rearwardly facing edge, nuts secured in said bosses, and bolts for mounting said guard structure on said bumper and for drawing said continuous rearwardly facing edge into abutting contact with said bumper outer face.

RAY A. SANDBERG.

REFERENCES CITED

The following references are of record in the file of this patent:

UNITED STATES PATENTS

| Number | Name | Date |
|---|---|---|
| D. 137,040 | Cadwallader | Jan. 11, 1944 |
| 1,404,517 | French | Jan. 24, 1922 |
| 1,516,961 | French et al. | Nov. 25, 1924 |
| 2,022,667 | Jandus | Dec. 3, 1935 |
| 2,023,079 | Jandus et al. | Dec. 3, 1935 |
| 2,070,429 | Gottlieb | Feb. 7, 1937 |
| 2,184,631 | Buchanan | Dec. 26, 1939 |
| 2,205,444 | Taylor | June 25, 1940 |
| 2,308,094 | Mears | Jan. 12, 1943 |